2,630,938

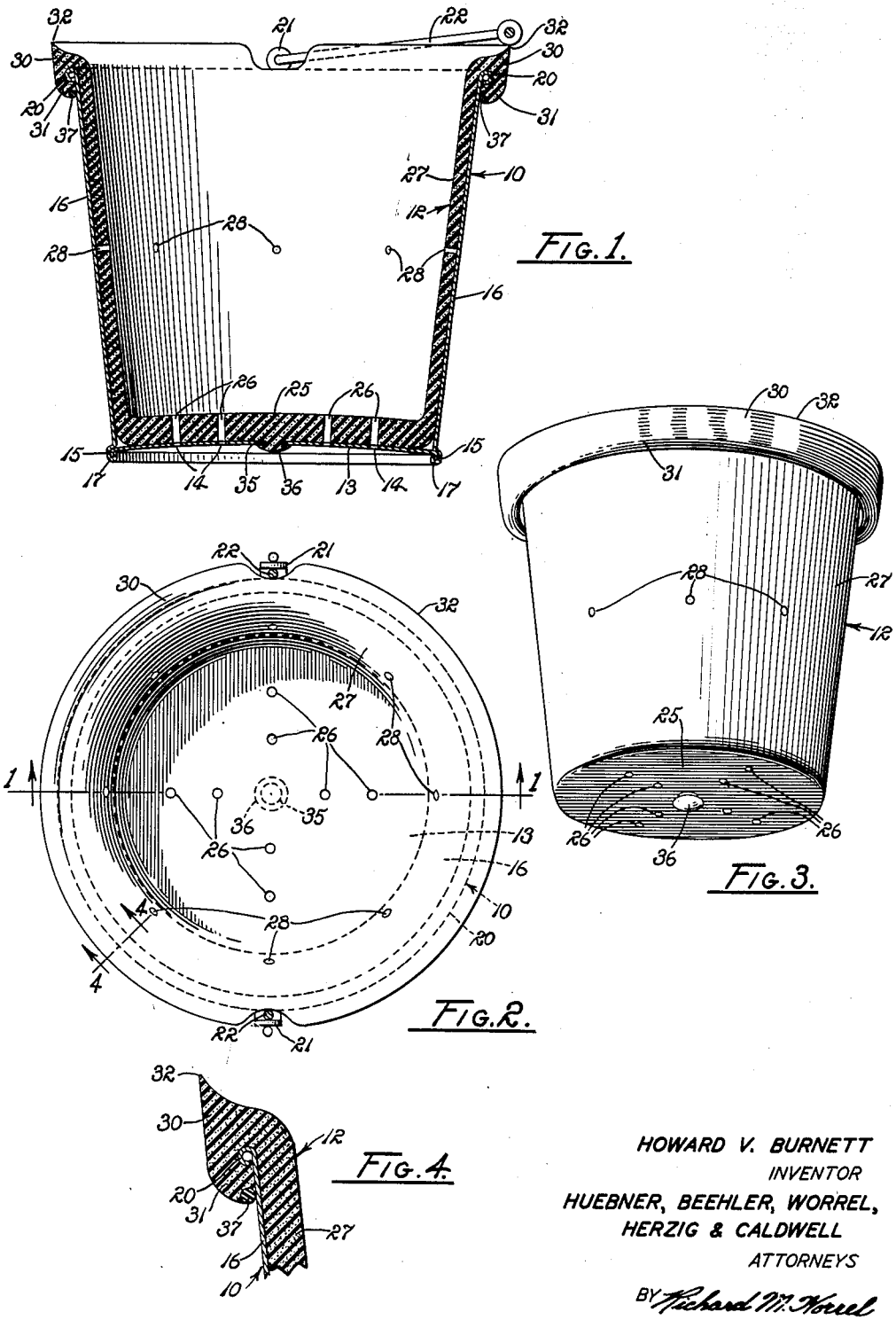
March 10, 1953     H. V. BURNETT     2,630,938
COMBINATION OF PICKING BUCKETS AND
CUSHIONING LINERS THEREFOR
Filed April 25, 1950
HOWARD V. BURNETT
INVENTOR
HUEBNER, BEEHLER, WORREL,
HERZIG & CALDWELL
ATTORNEYS Patented Mar. 10, 1953

UNITED STATES PATENT OFFICE 2,630,938

COMBINATION OF PICKING BUCKETS AND CUSHIONING LINERS THEREFOR

Howard V. Burnett, Sanger, Calif.

Application April 25, 1950, Serial No. 158,041

3 Claims. (Cl. 220—63)

The present invention relates generally to containers for perishable produce and more particularly to the combination of a picking bucket and cushioning liner therefor.

The production and marketing of fresh fruits and vegetables and other perishable products are fraught with many uncertainties. Weather variations make accurate crop prediction impossible. Variations in available water supply in irrigable areas cause wide fluctuations in bearing capacity and production quality of fruit trees, vines, and the like. Further, it is well known that the production and marketing of fresh fruits is one of the most highly competitive farm industries and the fresh fruit farmer generally operates on a relatively narrow margin of profit.

In spite of the production uncertainties and the narrow profit margin generally encountered, fresh fruit farmers and the like usually tolerate a serious loss of their produce during harvesting, such a significant loss in fact that its control can well mean the difference between operating at a loss and achieving a worthwhile return for a crop.

It is the usual practice to hand pick fruit and vegetables from their trees, vines, bushes, and the like, and to deposit them into metal picking buckets in which they are conveyed to handling, shipping, or storing containers generally in the form of boxes, baskets, or crates. A great amount of development work has been done in the sorting, grading, wrapping, packing, refrigeration, fumigation, and transporting of the produce which has successfully minimized loss thereof subsequent to reaching the containers referred to above but little or nothing has previously been done to develop picking containers effective in the reduction of harvest loss.

The present invention is concerned with the reduction or elimination of the major loss of produce which occurs during the harvesting and conveyance in picking buckets and the like to containers therefor. The hand picking of the produce is usually accomplished by means of somewhat skilled labor paid on a piecework basis. Being interested primarily in volume of produce harvested, such laborers work rapidly but with relatively little attention to preservation of the produce. It is not unusual for such laborers when not closely supervised, to toss, throw, or drop delicate fruits and vegetables into their metal picking buckets, thus skinning, abrading, puncturing, bruising, and otherwise damaging the harvested produce. Inasmuch as the smallest bruise or skin rupture of the fruit subsequently results in deterioration thereof, it is not unusual for the farmer to experience a 20% to 50% loss of his most delicate produce during the harvesting operation. It is therefore an object of the present invention to minimize the damage to fresh fruits, vegetables and the like conventionally experienced during hand harvesting operations.

Another object is to provide an improved picking container providing cushioned reception and support for produce contained therein.

Another object is to provide in combination with a bucket, a liner of resilient material adapted to provide cushioned support for containers of the bucket.

Another object is to provide a combined bucket and liner therefor which are expeditiously associated, dissociated, and cleaned.

Another object is to provide a bucket liner providing thorough ventilation of contents supported therein.

Another object is to provide an improved means for releasably interconnecting a bucket and cushioning liner therefor which is fully effective in maintaining a desired association of the bucket and its liner while the contents are deposited therein, yet which is readily releasable for dissociation of the bucket and liner.

Further objects and advantages will become apparent in the subsequent description in the specification.

In the drawing:

Fig. 1 is a vertical, diametrical section of a bucket and liner embodying the principles of the present invention.

Fig. 2 is a plan view of the bucket and liner shown in secton in Fig. 1, Fig. 1 being taken on line 1—1 of Fig. 2.

Fig. 3 is a perspective view of the liner of the present invention viewed from a positon therebelow for illustrative convenience.

Fig. 4 is an enlarged fragmentary section of the bucket and liner taken on line 4—4 of Fig. 2.

More specifically, a bucket is indicated generally at 10 in the drawing and the liner of the present invention at 12. As is the usual practice, the bucket is preferably made of galvanized iron or other suitable rigid material and provides a substantially circular bottom 13 having perforations 14 formed therethrough.

The bottom provides a down-turned peripheral edge 15. A frusto-conical side wall portion 16 is arranged with the smaller end thereof in circumscribing relation to the bottom 13 and the lower edge of the side wall portion rigidly affixed to the down-turned edge 15, as at 17. The upper end of the frusto-conical side wall portion is rolled outwardly forming an annular bead 20 in circumscribing relation to the upper end of said side wall portion. A pair of ears 21 is rigidly mounted on the side wall portion of the bucket, as by welding, brazing or the like. As is the usual practice, the ears are arranged on diametrically opposite sides of the bucket, upwardly extended therefrom, and pivotally mount a bail 22. With the exception of the perforations 14, the bucket is conveniently of the well known form. The combination of the present invention is not limited to a bucket of the precise form shown although illustrated thereby.

The liner 12 is formed of resilient and somewhat elastic material. Sponge or foam rubber is excellently suited to the purpose but it is to be understood that the present invention is not limited to this material, suitably employing any other material having the desired resilient characteristics such as cellulose sponge, plastic pad material, and the like.

The liner includes a bottom 25 fitted to the bottom 13 of the bucket and has perforations 26 formed therethrough in juxtaposition to the perforations 14 of the bucket bottom.

Integral with the bottom 25, frusto-conical side wall portions 27 are upwardly extended from the periphery thereof in fitted engagement with the side wall portions 16 of the bucket. To facilitate insertion of the liner, the side wall portions 27 are perforated, as at 28.

The side wall portions 27 are upwardly and outwardly extended over the bead 20 to form a funnel shaped portion 30. A lip 31 is extended downwardly from the funnel shaped portion 30 in constricted elastic engagement with the periphery of the bucket 12 in fitted engagement with the bead 20. A significant feature of the funnel shaped portion is its extension upwardly and radially outwardly to an apex, indicated at 32, above and radially outwardly of the bead 20. Not only does this achieve an incidental funneling effect on fruit and the like deposited in the device, but a more secure mounting and retention of the liner in the bucket 12 is attained than would otherwse be achieved. It has been discovered that if the side wall portion 27 of the liner is merely curved around the bead the effect of an object striking such a rolled formation is that of loading an arch having unrestrained ends or piers. That is, such striking tends to spread the rolled formation and eventually to loosen its hold on the bead. Inasmuch as the side wall portions are preferably maintained under slight initial tension in the bucket, the use of a simple roll formation over the bead permits such formation to creep inwardly of the bucket until the bead is disengaged. As is evident by inspection of Fig. 4, when fruit or the like strikes the apex 32, there is a turning movement imparted to the funnel shaped portion 30 about the bead 20 urging the lip 31 into tighter embracing relation with the bead and thus the described loosening of the rolled formation is obviated.

The bottom 13 of bucket 12 is provided with a central bore 35. A headed button 36 is affixed or formed integrally with the bottom 25 of the liner and inserted downwardly through the bore 35 wherebelow it expands, securing the liner in the bucket with the side wall portions 27 thereof slightly tensioned between the bead 20 and the bottom. It has been found that the vulcanizing of an elastic edge 37 on the lip 31 and the formation of the button 36 of similar material provides a more durable structure and a useful adjunct to the present invention. Latex rubber is excellently suited to this purpose.

When sponge or foam rubber or a comparable material is employed, the bottom 25 of the liner is made thicker than the side wall portions 27. For example, to make the bottom from one-half to three-fourths of an inch thick, the side wall portions 27 approximately three-eighths of an inch thick and the funnel shaped portion 30 from one-half to three-fourths of an inch in vertical depth directly above the bead 20 provides excellent cushioning effect. These dimensions are suggested for illustrative convenience and are not intended to limit the structure of the present invention.

Operation

The utility of the present invention is believed to be clearly apparent and is briefly summarized at this point. The liner 12 is associated with the bucket 10 by inserting the same downwardly into the bucket in fitted engagement therewith. The resilient and elastic characteristics of the material of which the liner is formed, permits the lip 31 to be snapped over the bead 20 maintaining the upper end of the liner in dependable connection with the bucket. The button 36 is inserted downwardly through the bore 35 and expanded therebelow, locking the liner in position in the bucket with the side walls 27 thereof under slight tension.

Fruit, vegetables, and the like are deposited in the bucket, receiving cushioned support on the bottom 25 of the liner and the side walls 27. The funnel shaped portion precludes damage to the fruit if dropped above the bead 20, provides dependable mounting of the liner, as previously described, and facilitates, to a small degree, the direction of fruit and the like into the combined bucket-liner structure.

The perforations 28 facilitate insertion of the liner into the bucket by avoiding air pockets between the side wall portion 27 of the liner and side wall portion 16 of the bucket. The perforations 26 and 14 provide air vents admitting air through the bottom of the structure and facilitating its passage upwardly by the contents of the bucket and liner. The perforations 26 and 14 serve to drain liquid from the bucket which with certain produce tends to collect therein, permits the descent of dust and debris downwardly from the bucket, and as an incidental function, makes the cushion somewhat more resilient.

To remove the liner 12, the button 36 is thrust upwardly through the bore 35, the funnel shaped portion 30 rolled inwardly moving the lip 31 out around the bead 20, and the liner readily lifted from the bucket for convenience in cleansing, storage, or replacement.

The employment of the combined bucket and liner of the present invention in the harvesting of perishable fruit and vegetables has substantially reduced losses incident to the hand picking operation. The structure is at most only slightly heavier than a bucket of the same capacity.

Although the invention has been herein shown and described in what is conceived to be the most practical and preferred embodiment, it is recognized that departures may be made therefrom with the scope of the invention, which is not to be limited to the details disclosed herein but is to be accorded the full scope of the claims so as to embrace any and all equivalent devices and structures.

Having described my invention, what I claim as new and desire to secure by Letters Patent is:

1. In combination with the bucket having a substantially circular perforated bottom, a frusto-conical side wall portion connected to the circular periphery of the bottom of the bucket and upwardly and outwardly extended therefrom, and an annular outwardly rolled bead in circumscribing relation to the upwardly extended edge of the side wall portion; a liner of resilient and elastic material comprising a bottom portion substantially fitted to the bottom of the bucket and having perforations formed therethrough in juxtaposition with the perforations of the bottom of the bucket, a frusto-conical side wall portion integral with the bottom portion of the liner fitted in overlaying relation to the side wall portion of the bucket, said side wall portion of the liner having perforations formed therethrough, a funnel shaped portion integral with the side wall portion of the liner upwardly and outwardly extended over the bead of the bucket, said funnel shaped portion terminating at its uppermost extremity radially outwardly of the outermost extremity of the bead, said funnel shaped portion also being downwardly extended and fitted in elastic embracing relation over the bead, and means fastening the bottom of the liner to the bottom of the bucket with the side wall portion of the liner tensioned between the bead and the bottom of the bucket.

2. In combination with a bucket having a substantially circular bottom, a frusto-conical side wall portion connected to the circular periphery of the bottom of the bucket and upwardly and outwardly extended therefrom, and an annular outwardly rolled bead in circumscribing relation to the upwardly extended edge of the side wall portion; a liner of resilient and elastic material comprising a bottom portion substantially fitted to the bottom of the bucket, a frusto-conical side wall portion integral with the bottom portion of the liner fitted in overlaying relation to the side wall portion of the bucket, a funnel shaped portion integral with the side wall portion of the liner upwardly and outwardly extended over the bead of the bucket, said funnel shaped portion terminating at its uppermost extremity radially outwardly of the outermost extremity of the bead, said funnel shaped portion also being downwardly extended and fitted in elastic embracing relation over the bead, and means fastening the bottom of the liner to the bottom of the bucket with the side wall portion of the liner tensioned between the bead and the bottom of the bucket.

3. A bucket liner of resilient and elastic material comprising a substantially circular bottom portion, a frusto-conical side wall portion integral with the bottom portion extended from the periphery of the bottom portion, said side wall portion being of progressively increased diameter in spaced relation to the bottom portion and providing inwardly and outwardly disposed surfaces, a funnel shaped portion integral with the side wall portion of the liner oppositely extended from the bottom outwardly over the side wall portion and terminating at its uppermost extremity appreciably radially outwardly from alignment with the outwardly disposed surface of the wall portion, said funnel shaped portion providing a lip extended toward the bottom portion outwardly adjacent to the outwardly disposed surface of the wall portion and having an annular groove therein disposed toward the wall portion, and an annular member of elastic material integral with the lip of the funnel shaped portion below the annular groove and constricting said lip against the wall portion.

HOWARD V. BURNETT.

REFERENCES CITED

The following references are of record in the file of this patent:

UNITED STATES PATENTS

| Number | Name | Date |
|---|---|---|
| 126,249 | Bollinger | Apr. 30, 1872 |
| 179,354 | Schifferle | June 27, 1876 |
| 1,667,114 | Hooker | Apr. 24, 1928 |
| 1,786,827 | Copeman | Dec. 30, 1930 |
| 2,033,285 | Harvey | Mar. 10, 1936 |
| 2,065,293 | Scudder | Dec. 22, 1936 |
| 2,091,459 | Smilack | Aug. 31, 1937 |
| 2,131,855 | Hummel | Oct. 4, 1938 |
| 2,209,403 | Kittner et al. | July 30, 1940 |
| 2,395,606 | Zinkel et al. | Feb. 26, 1946 |

FOREIGN PATENTS

| Number | Country | Date |
|---|---|---|
| 430,256 | Great Britain | June 17, 1935 |
| 470,533 | France | June 17, 1914 |